United States Patent [19]
Boezen et al.

[11] Patent Number: 5,898,729
[45] Date of Patent: *Apr. 27, 1999

[54] FAULT TOLERANT DIGITAL TRANSMISSION SYSTEM

[75] Inventors: Hendrik Boezen, Nijmegen, Netherlands; Harald Eisele, Pinneberg, Germany

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/541,380

[22] Filed: Oct. 10, 1995

[30] Foreign Application Priority Data

Oct. 10, 1994 [EP] European Pat. Off. ............... 94202925

[51] Int. Cl.⁶ .................................................. H04L 27/00
[52] U.S. Cl. ......................... 375/259; 375/288; 375/295; 375/219
[58] Field of Search ................................. 375/219, 257, 375/288, 224, 244, 318, 319, 349, 259; 370/216; 395/182.02

[56] References Cited

U.S. PATENT DOCUMENTS 4,539,680  9/1985  Hudspeth et al. ...................... 370/119
4,744,097  5/1988  Haruhara ................................. 375/219
5,050,187  9/1991  Ichie ....................................... 375/257
5,317,597  5/1994  Eisele ..................................... 375/257

FOREIGN PATENT DOCUMENTS 0295897    12/1988   European Pat. Off. .
0529602     3/1993   European Pat. Off. .
003926885 A1  2/1991  Germany ............................... 375/257

OTHER PUBLICATIONS

"Digital Integrated Electronics", Taub and Schilling, Published by McGraw–Hill, 1977, ISBN 0–07–085788–1. p. 256–7.

*Primary Examiner*—Jason Chan
*Assistant Examiner*—Jean B. Corrielus
*Attorney, Agent, or Firm*—Jack D. Slobod

[57] ABSTRACT

In a transmission system a transmitter (12) is coupled to a receiver (13) via a transmission line comprising two wires (1,2). The transmitter (12) generates on said wires two voltages with respect to a reference voltage being opposite in phase. To enable the transmission system to operate in case of a short circuit between the wires (1,2), said two voltages are generated by sources having different short circuit currents.

8 Claims, 2 Drawing Sheets

FAULT TOLERANT DIGITAL TRANSMISSION SYSTEM

BACKGROUND OF THE INVENTION

The invention is related to a digital transmission system comprising a transmitter having a first source for generating in response to digital symbols a first voltage with respect to a reference voltage on a first wire of a transmission line, a second source for generating a second voltage with respect to said reference voltage on a second wire of the transmission line, said second voltage having an opposite phase with respect to the first voltage, the transmission system further comprises at least one receiver coupled to said transmission line, having a detector for deriving digital symbols from the voltage difference between the first and second wire.

The invention is further related to a transmitter, a receiver and a transceiver for such a transmission system.

A transmission system according to the preamble is known from the book "Digital Integrated Electronics" by H. Taub and D. Schilling, published by McGraw-Hill, 1977, ISBN 0-07-085788-1.

Transmission systems according to the preamble can be used in local area networks, in several bus systems, and the local loop area of a digital telephone system. In the known transmission system, a first end of a transmission line consisting of two wires is connected to a transmitter. A first source is connected to a first wire of the transmission line, and a second source is connected to a second wire of the transmission line. The signals generated by the first and second source are opposite in phase.

The receiver being connected to a second end of the transmission line is provided with a detector connected to the first wire and the second wire of the transmission line for deriving digital symbols from the voltage difference between the first wire and the second wire. Because the first and the second source generate voltages having opposite phases the information to be transmitted can be derived from the voltage difference between the two wires. This reduces the vulnerability of the transmission system to electromagnetic interference, resulting in an increase of electromagnetic compatibility (EMC) properties.

In the known transmission system no transmission is possible if a short circuit arises between the first wire and the second wire, so the complete transmission system will fail.

SUMMARY OF THE INVENTION

The object of the invention is to provide a transmission system according to the preamble in which transmission is still possible if a short circuit arises between the first and the second wire.

Therefore the transmission is characterized in that the first source and the second source have a differing short circuit current and in that the receiver comprises at least one additional detector for deriving digital symbols from the voltage between the first wire and the reference voltage.

By making the short circuit currents of the two sources different, a voltage representing the symbols to be transmitted will be still available between the wires and the reference voltage. By using an additional detector for deriving digital symbols from the voltage difference between the wires and the reference voltage, communication remains possible. It is required that the reference voltage (or a voltage derived thereof) is available at the transmitter and the receiver. This can e.g. be obtained by using a shielded twisted pair cable, in which the shield is used for transferring the reference voltage. In local area networks to be used e.g. in cars the metal of the car (GROUND) can be used for transferring the reference voltage.

An embodiment of the invention is characterized in that the receiver comprises a further additional detector for deriving digital symbols from the voltage between the first wire and the reference voltage.

By using a further additional detector it is possible to maintain transmission if one of the wires is interrupted. In this way a reliable system is obtained which remains functional under several faults of the transmission line.

A further embodiment of the invention is characterized in that the receiver comprises means for deriving from the symbols derived by the detector and the additional detector, a signal indicating a short circuit between the first and second wire.

By deriving a signal indicating a short circuit, a message can be displayed indicating that servicing is required. It is also conceivable that the signal indicating a short circuit is transmitted to the transmitted to request a decrease in transmission rate, in order to cope with the increased vulnerability with respect to interfering signals.

BRIEF DESCRIPTION OF THE DRAWING

The present invention will now be explained with reference to the drawings, in which.

DESCRIPTION OF THE PREFERRED EMBODIMENTS

Figure 1:
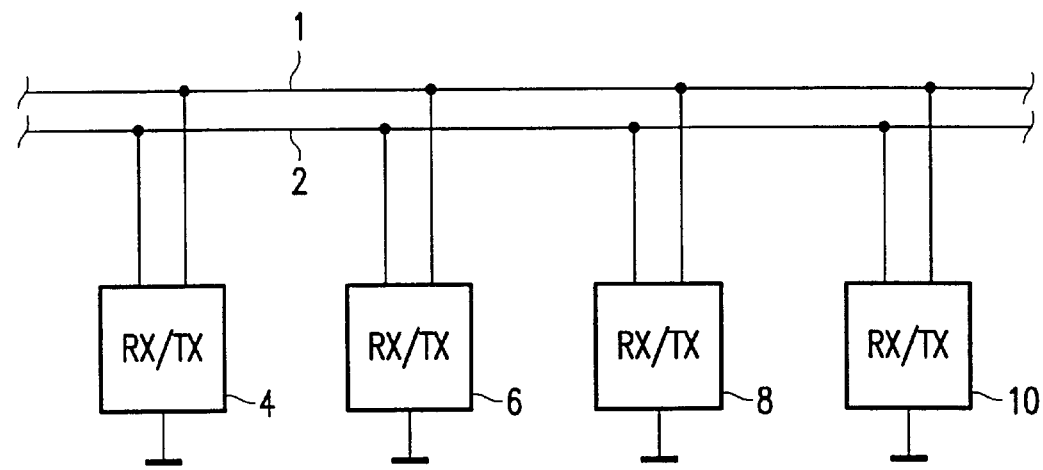
FIG. 1, shows a transmission system in which the invention can be used.

In the transmission system according to FIG. 1 the transmission line is constituted by a twisted pair with wires 1 and 2. Each of the transceivers 4, 6, 8, and 10 is provided with two terminals being connected to the wire 1 and to the wire 2. A third terminal of each of the transceivers 4, 6, 8, and 10 is connected to the reference voltage, here indicated as ground terminal.

In the transmission system according to FIG. 1 only one transceiver can be in the transmitting mode. One or more of the other transceivers are in the receiving mode. The access of the transmitters to the transmission line can be controlled by numerous well known multiple access methods, like random access such as (slotted) ALOHA, time division multiple access or bus arbitration schemes using a bus arbiter.

The voltages with respect to the reference voltage put on the first wire 1 and the second wire 2 of the transmission are opposite in phase. In the transceivers in the receiving mode the symbols to be received are derived from the voltage between the wires 1 and 2. This results in a decreased vulnerability to interference by common mode voltages on both wires 1 and 2.

Figure 2:
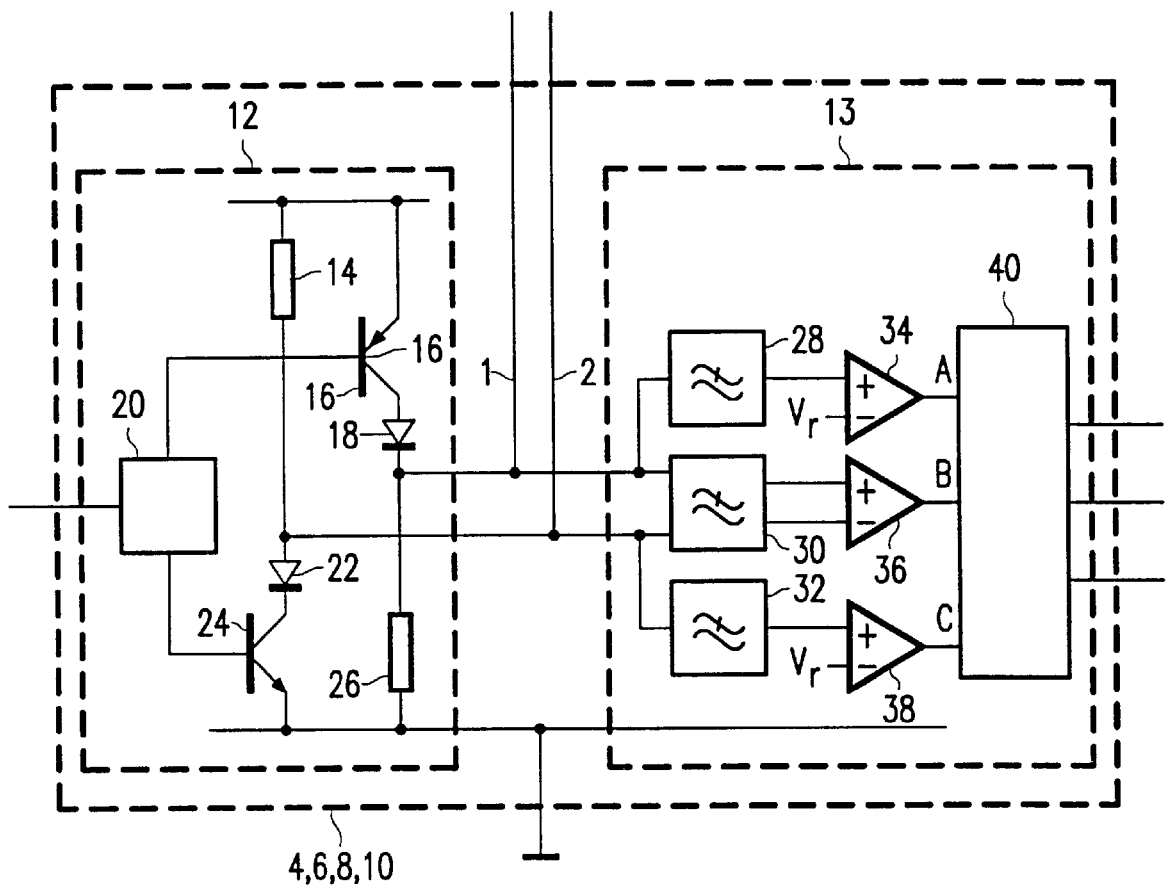
FIG. 2, shows an embodiment of a transceiver for use in the transmission according to the invention.

In the transceiver according to FIG. 2, the digital signal to be transmitted by a transmitter section 12 is applied to an input of a drive circuit 20. A first output of a drive circuit 20 is connected to the base of a PNP transistor 16. The emitter of the PNP transistor 16 is connected to a positive supply voltage. The collector of the PNP transistor is connected to the anode of a diode 18. The cathode of the diode 18 is connected to the first input/output terminal of the transceiver, and to a first terminal of a resistor 26. A second terminal of the resistor 26 is connected to ground. The first source is constituted by the PNP transistor 16, the diode 18, the drive circuit 20 and the resistor 26.

A second output of a drive circuit 20 is connected to the base of an NPN transistor 24. The emitter of the NPN transistor 24 is connected to ground. The collector of the NPN transistor 24 is connected to the cathode of a diode 22. The anode of the diode 22 is connected to the second input/output terminal of the transceiver, and to a first terminal of a resistor 14. A second terminal of the resistor 14 is connected to the positive supply voltage ground. The second source is constituted by the NPN transistor 24, the diode 22, the drive circuit 20 and the resistor 14.

The first terminal is also connected to a first input of a receiver section 13. Said first input is connected to an input of a low-pass filter 28 and a first input of a low-pass filter 30. The second terminal is also connected to a second input of the receiver section 13. Said second input is connected to an input of a low-pass filter 32 and a second input of the low-pass filter 30. Two outputs of the low-pass filter 30 are connected to two corresponding inputs of the first detector being here a comparator 36. An output of the low-pass filter 28 is connected to a first input of an additional detector, being here a comparator 34. A second input of the comparator 34 is connected to a voltage $V_r$. An output of the low-pass filter 32 is connected to a first input of a further additional detector, being here a comparator 38. A second input of the comparator 38 is connected to the voltage $V_r$. The outputs of the comparators 34, 36 and 38 are connected to a processing circuit 40. The processing circuit 40 determines the values of the output symbols, and generates a first fault signal in the presence of a short circuit between the first and second wire, and generates a second fault signal in the presence of an interruption of one of the wires 1 or 2.

The drive circuit 20 in the transceiver according to FIG. 2, generates drive signals for the NPN transistor 24 and the PNP transistor 16. The drive circuit 20 is arranged in such a way that the short circuit current (maximum current) that can be delivered by the NPN transistor 24 is different from the short circuit current (maximum current) that can be delivered by the PNP transistor 16. In practice a difference by a factor of two can be chosen. A suitable choice is a short circuit current of 50 mA for the PNP transistor 16 and a short circuit current of 100 mA for the NPN transistor 24. The values of the resistors may be the same, to obtain a symmetrical output voltage if the wires 1 and 2 are not short circuited.

If the transmission system operates correctly, the NPN transistor 24 and the PNP transistor 16 are switched off if a digital symbol with a logical value "0" is applied to the input of the drive circuit 20. Then the voltage on the wire 1 is approximately equal to the ground level, and the voltage on the wire 2 is approximately equal to the positive supply voltage. If a digital symbol with a logical value "1" is applied at the input of the drive circuit 20, the NPN transistor 24 and the PNP transistor 16 are conducting. In normal circumstances the maximum current in the NPN transistor 24 and the PNP transistor 16 will be limited by the external circuitry, resulting in that the NPN transistor 24 and the PNP transistor 14 will be in the "bottomed" state. Then the voltage on the wire 1 will be equal to the positive supply voltage, and the voltage on the wire 2 will be equal to the ground level. In this way two signals having an opposite phase are available on the wires 1 and 2. The diode 22 is present to prevent reverse conduction of the NPN transistor 24 if the voltage at the wire 2 is forced below ground level due to external circumstances. If the transmitter is realized as an integrated circuit such reverse conduction of the NPN transistor 24 can cause substrate currents, which can cause erroneous operation of the complete integrated circuit. The diode 18 is present to prevent reverse conduction of the PNP transistor 16 if the voltage at the wire 1 is forced above the positive supply voltage.

The signal generated in this way can be easily detected by the receiver 13 of another transceiver. The filter 30 eliminates interference and noise in the frequency range above the cut off frequency of the low-pass filter 30. The detector 30 determines the value of the received symbols by determining the sign of the signal between its inputs.

If the wires 1 and 2 are short circuited the voltage on the wires 1 and 2 will be equal to half the supply Voltage when the NPN transistor 24 and the PNP transistor 16 are switched off in the case the resistors 14 and 26 are equal. If the NPN transistor 24 and the PNP transistor 16 are switched on, half the difference between the maximum current in the NPN transistor 24 and the PNP transistor 16 will be added to the current in the resistor 14 and will be subtracted from the current in the resistor 26. This results in a decrease of the voltage on the wires 1 and 2. This decrease can be detected by the detectors 34 and 38 enabling the communication to continue during presence of a short circuit between the wires 1 and 2.

If a transmission code with error detection capabilities is used, the processing circuit can determine whether the symbols detected by the detector 36 are correct. If these symbols are correct no further action of the processing circuit is required. If these symbols are in error, the processing circuits checks whether the symbols detected by the detector 34 and/or 38 are correct. If the symbols detected by the detectors 34 and 38 are both correct, there must be a short circuit present between the first and second wire, and the first fault signal is activated. If the symbols detected by the detector 34 or 38 is not correct, an interruption of the corresponding wire is present, and the second fault signal is activated.

Figure 3:
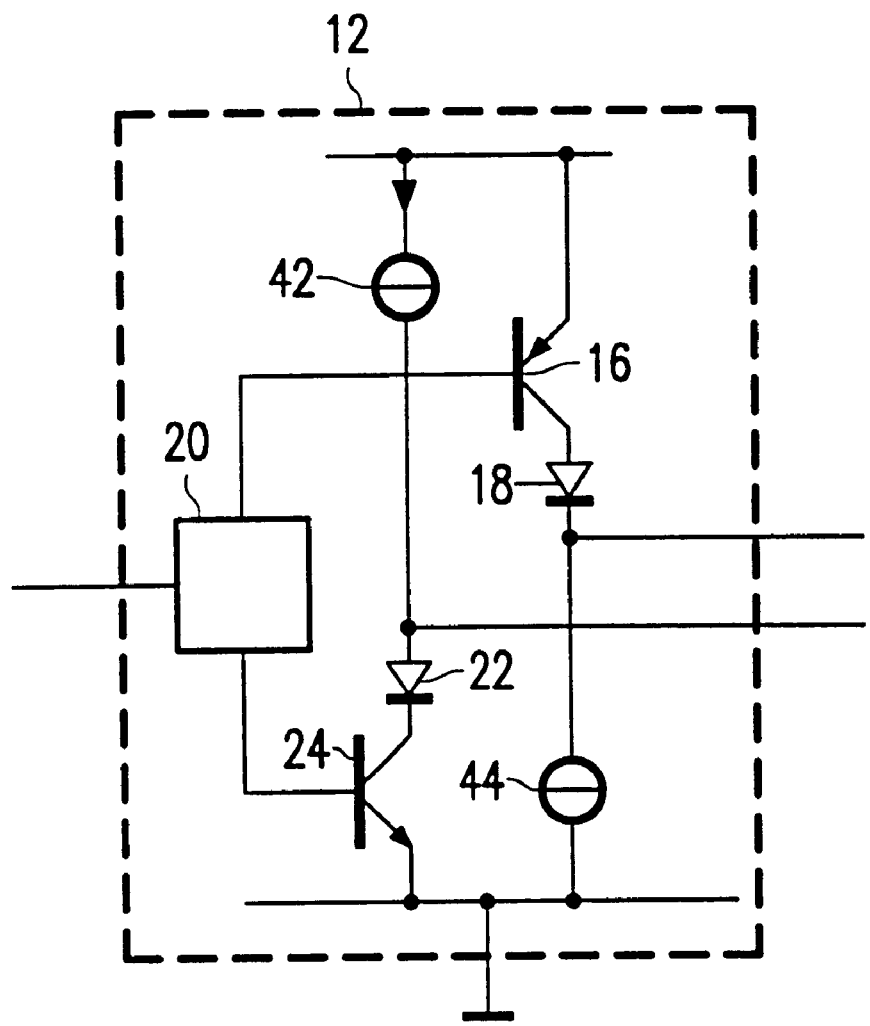
FIG. 3, shows an alternative embodiment of the transmitter 12 of the transceiver according to FIG. 2.

In the transmitter according to FIG. 3, the digital signal to be transmitted is applied to an input of a drive circuit 20. A first output of a drive circuit 20 is connected to the base of a PNP transistor 16. The emitter of the PNP transistor 16 is connected to a positive supply voltage. The collector of the PNP transistor is connected to the anode of a diode 18. The cathode of the diode 18 is connected to the first output terminal of the transmitter, and to a first terminal of a current source 44. A second terminal of the current source 44 is connected to ground. The first source is constituted by the PNP transistor 16, the diode 18, the drive circuit 20 and the current source 44.

A second output of a drive circuit 20 is connected to the base of an NPN transistor 24. The emitter of the NPN transistor 24 is connected to ground. The collector of the NPN transistor 24 is connected to the cathode of a diode 22. The anode of the diode 22 is connected to the second output terminal of the transmitter 12, and to a first terminal of a current source 42. A second terminal of the current source 42 is connected to the positive supply voltage. The second source is constituted by the NPN transistor 24, the diode 22, the drive circuit 20 and the current source 42.

In the transmitter 12 according to FIG. 3, the drive circuit 20 generates drive signals for the NPN transistor 24 and the PNP transistor 16. The drive circuit 20 is arranged in such a way that the short circuit current (maximum current) that can be delivered by the NPN transistor 24 is different from the short circuit current (maximum current) that can be delivered by the PNP transistor 16. In practice a difference by a factor of two can be chosen. A suitable choice is a short circuit current of 50 mA for the PNP transistor 16 and a short circuit current of 100 mA for the NPN transistor 24. The currents delivered by the current sources 42 and 44 is also different. A suitable choice is 2 mA for the current source 42 and 1 mA for the current source 44.

If the transmission system operates correctly, the NPN transistor 24 and the PNP transistor 16 are switched off if a digital symbol with a logical value "0" is applied to the input of the drive circuit 20. Then the voltage on the first output terminal is approximately equal to ground level, and the voltage on the second output terminal of the transmitter 12 is approximately equal to positive supply voltage. If a digital symbol with a logical value "1" is applied at the input of the drive circuit 20, the NPN transistor 24 and the PNP transistor 16 are conducting. In normal circumstances the maximum current in the NPN transistor 24 and the PNP transistor 16 will be limited by the external circuitry, resulting in that the NPN transistor 24 and the PNP transistor 14 will be in the "bottomed" state. Then the voltage on the first output terminal of the transmitter will be equal to the positive supply voltage, and the voltage on the second output of the transmitter 12 will be equal to the ground level. In this way two signals having an opposite phase are available on the first and second terminal of the transmitter 12.

If the output terminals of the transmitter 12 are short circuited the voltage on the said terminals will be equal to the positive supply voltage when the NPN transistor 24 and the PNP transistor 16 are switched off because the current delivered to the output terminals by current source 42 exceeds the current drawn by the current source 44 from said output terminals. If the NPN transistor 24 and the PNP transistor 16 are switched on, the voltage on the output terminals will be approximately equal to ground level, because the maximum collector current of the NPN transistor 24 exceeds the maximum collector current of the PNP transistor 16.

We claim:

1. A digital transmission system comprising a transmitter having a first source for generating in response to digital symbols a first voltage with respect to a reference voltage on a first wire of a transmission line and a second source for generating in response to said digital symbols a second voltage with respect to said reference voltage on a second wire of the transmission line, said second voltage having an opposite phase with respect to the first voltage, said first and second sources being simultaneously in a switched on state in response to a particular type of digital symbol, the transmission system further comprising at least one receiver coupled to said transmission line, having a detector for deriving digital symbols the voltage difference between the first and wires, wherein the first source and the second source have a differing short circuit current in order to cooperatively generate a variation in a voltage between the first wire and the reference voltage in response to digital symbols of different types when the first and second wires are shorted together and the receiver comprises at least one additional detector for deriving digital symbols from the voltage between the first wire and the reference voltage, thereby avoiding data loss when the first and second wires are shorted together.

2. The digital transmission system according to claim 1, wherein the receiver comprises a further additional detector for deriving digital symbols from a voltage between the second wire and the reference voltage.

3. The digital transmission system according to claim 1, wherein the receiver comprises means for deriving from the digital symbols derived by the detector and the additional detector, a signal indicating a short circuit between the first and second wire.

4. The digital transmission system according to claim 2, wherein the receiver comprises means for deriving from the digital symbols derived by the detector, the additional detector and the further additional detector a signal indicating an interruption of the first or second wire.

5. A transmitter comprising a first source for generating in response to digital symbols a first voltage with respect to a reference voltage on a first terminal and a second source for generating in response to said digital symbols a second voltage with respect to said reference voltage on a second terminal, said second voltage having an opposite phase with respect to the first voltage, said first and second sources being simultaneously in a switched on state in response to a particular type of the digital symbols, wherein the first source and the second source have a differing short circuit current in order to cooperatively generate a variation in the voltage between the first terminal and the reference voltage in response to digital symbols of different types when the first and second terminals are shorted together.

6. A transceiver having a first source for generating in response to digital symbols a first voltage with respect to a reference voltage on a first terminal and a second source for generating in response to said digital symbols a second voltage with respect to said reference voltage on a second terminal, said second voltage having an opposite phase with respect to the first voltage, said first and second sources being simultaneously in a switched on state in response to a particular type of the digital symbols, the transceiver further comprising a detector for deriving digital symbols from a voltage difference between the first and second terminals, wherein the first source and the second source have a differing short circuit current in order to cooperatively generate a variation in a voltage between the first terminal and the reference voltage in response to digital symbols of different types when the first and second terminals are shorted together and the transceiver comprises at least one additional detector for deriving digital symbols from the voltage between the first terminal and the reference voltage, thereby avoiding data loss when the first and second terminals are shorted together.

7. The transceiver according to claim 6, wherein the transceiver comprises a further additional detector for deriving digital symbols from a voltage between the second terminal and the reference voltage.

8. The transceiver according to claim 6 further comprises means for deriving from the digital symbols derived by the detector and the additional detector, a signal indicating a short circuit between the first and second terminals.

* * * * *